United States Patent [19]

Rahman et al.

[11] 3,950,560

[45] Apr. 13, 1976

[54] METHOD OF PRODUCING COMPACTED, DEHYDRATED, VEGETABLE PRODUCTS OF INCREASED DENSITY

[75] Inventors: Abdul R. Rahman; Glenn R. Schafer, both of Natick, Mass.

[73] Assignee: The United States of America as represented by the Secretary of the Army, Washington, D.C.

[22] Filed: June 14, 1974

[21] Appl. No.: 479,403

[52] U.S. Cl. ............... 426/385; 426/454; 426/465; 426/615; 426/468
[51] Int. Cl.² ........................................... A23B 4/04
[58] Field of Search .......... 426/465, 468, 473, 274, 426/372, 377, 454, 460, 456, 464, 385

[56] References Cited
UNITED STATES PATENTS

| | | | |
|---|---|---|---|
| 3,174,869 | 3/1965 | Roberts et al. | 426/465 |
| 3,385,715 | 5/1968 | Ishler et al. | 426/274 |
| 3,468,672 | 9/1969 | Schwartzberg | 426/385 |
| 3,812,268 | 5/1974 | Corey et al. | 426/372 |

FOREIGN PATENTS OR APPLICATIONS

| | | | |
|---|---|---|---|
| 576,895 | 4/1946 | United Kingdom | 426/468 |

OTHER PUBLICATIONS

Arsdel et al., "Food Dehydration", Vol. 2, Avi Pub. Co. Inc., Westport, Conn., 1973, pp. 2, 37.

Gooding, "Some Recent Work on Dehydration in the United Kingdom", Food Technology, G/1957, Vol. 11, No. 6.

Agriculture Research Administration, U.S. Dept. of Agriculture, "Experimental Compression of Dehydrated Foods", Miscellaneous Pub. 647, pp. 22, 23, 1948.

*Primary Examiner*—S. Leon Bashore
*Assistant Examiner*—Kenneth M. Schor
*Attorney, Agent, or Firm*—Nathan Edelberg; Robert P. Gibson; Charles C. Rainey

[57] ABSTRACT

Method of producing compacted, dehydrated, vegetable products of increased density comprising predrying without freezing morsels of a vegetable, the moisture content of the vegetable being thereby reduced to from about 7 percent to about 18 percent, substantially immediately after the predrying step compressing the predried vegetable at a temperature of about 110°F. to 120°F. and at a pressure of about 200 psi to 4000 psi, thereafter redrying the compacted vegetable mass to a moisture content of about 1 to 5 percent.

11 Claims, No Drawings

METHOD OF PRODUCING COMPACTED, DEHYDRATED, VEGETABLE PRODUCTS OF INCREASED DENSITY

The invention described herein may be manufactured, used, and licensed by or for the Government for governmental purposes without the payment to us of any royalty thereon.

BACKGROUND OF THE INVENTION

This invention relates to a process of producing compacted, dehydrated, vegetable products of increased density by predrying, compressing, and redrying vegetables under certain conditions described hereinafter to obtain such vegetables in a form that is highly storage stable and readily rehydratable to form vegetable morsels closely resembling the vegetables prior to dehydration and compression thereof, the vegetables being quite acceptable after rehydration from the compressed and redried form.

Highly compacted, freeze-dehydrated vegetables which are dense and, therefore, occupy comparatively small space for the amount of nutrients provided thereby are well-known, particularly in the field of military rations. However, the preparation of such compacted, dehydrated vegetables has heretofore been very expensive since the production of such products has involved freeze-vacuum-dehydration. This is a high-cost method of removing moisture from foods. Furthermore, it produces very brittle materials which, if compressed in the brittle state, shatter. In the case of vegetables, the identity of morsels of the vegetables would be completely lost. Rehydration of such a product would result in a mushy product which in most cases whould have a very low acceptability rating.

Various attempts have been made to reduce the volumes and increase the densities of dehydrated vegetables without destroying their abilities to return to substantially the conditions they were in prior to dehydration. One such method has involved remoistening a freeze-dried vegetable enough to plasticize the vegetable matter and permit compression thereof without shattering morsels of the vegetable. Such a procedure requires time-consuming equilibration of moisture sprayed onto the freeze-dried vegetable before compression of the vegetable can be carried out if shattering is to be avoided. A procedure of this type is disclosed in Ishler, U.S. Pat. No. 3,385,715.

It has been proposed that freeze-vacuum-dehydration of vegetables be halted at moisture contents which would permit compression of the vegetables to the extent desired. However, this has been found to be impractical because freeze-drying involves removal of moisture by sublimation of water from the outer layers of cells leaving the core material still moist when the outer layers are very dry and brittle. It is very difficult in practice to determine when the proper average moisture content of the vegetable has been reached. Then it becomes necessary to allow the vegetable to stand in a closed vessel or area for a long time to accomplish equilibration of the moisture throughout the vegetable in order to avoid shattering the outermost portions of the vegetable during compression. A further drawback in such a procedure is that during equilibration of the moisture quality of the vegetable may deteriorate, especially in the more moist core material since the moisture migrates very slowly from the core to the surface of each vegetable morsel.

Air drying of vegetable morsels directly to a moisture content low enough for the product to be storage stable, followed by compression, has been attempted; however, this results in shattering of the structure of the vegetable morsels with the attendant production of many fines. These fines cannot be rehydrated to substantially the original physical condition of the vegetable. In addition, the fines do not adhere well when compressed.

It is generally accepted that the moisture content required in most vegetables if they are to be storage stable for at least 3 years at 70° F. or at least 6 months at 100° F. is no greater than 5 percent by weight. In general, the lower the moisture content, the greater the storage stability of a vegetable.

It is accordingly an object of the present invention to provide an economical method of producing compacted, dehydrated, vegetable products of increased density which possess the ability to rehydrate to substantially the physical state of the vegetable products prior to dehydration thereof.

A further object is to provide a method of producing such compacted, dehydrated vegetables of increased density which, when rehydrated, will be restored to morsel form such as the vegetable possessed prior to dehydration and compression thereof.

A still further object is to provide a method of producing such compacted, dehydrated vegetables of increased density which will have good storage stability when packaged and hermetically sealed in a container which is impervious to moisture and which will be readily rehydratable after long-term storage to restore the vegetables to morsel form such as they had prior to dehydration and compression including good acceptablilty.

Other objects and advantages will appear from the following description of the invention, and the novel features will be particularly pointed out in connection with the appended claims.

SUMMARY OF THE INVENTION

The dehydrated vegetable products of increased density over their density in either their original state or their uncompressed dehydrated state are prepared by predrying (without freezing) a vegetable in morsel form to a moisture content of from about 7 percent to about 18 percent by weight, substantially immediately thereafter compressing the predried, vegetable morsels to form a compacted, vegetable mass, and thereafter redrying (further dehydrating) the compacted, vegetable mass to a moisture content of not more than about 5 percent by weight and preferably from about 1 percent to about 5 percent by weight.

Other process conditions are, of course, important for attaining the desired result of producing a compacted, dehydrated vegetable of increased density which has good storage stability which is capable of being readily rehydrated to restore the vegetable to a morsel form similar to that in which it existed prior to dehydration and compression, and which upon being rehydrated has good acceptability compared with the original vegetable. These process conditions will be more particularly described hereinafter and the manner in which they affect the processing of various vegetables will also be pointed out.

DESCRIPTION OF THE PREFERRED EMBODIMENTS

It is to be understood that whenever a percentage of moisture is stated either in the Specification or Claims, it is intended that this be the percentage by weight of the vegetable concerned.

We have found that vegetables in the form of morsels, when subjected to compression to produced dense forms of the vegetables, require certain amounts of moisture to plasticize the cells so that the cellular structure of the vegetables will not be destroyed. When the moisture content of a vegetable falls below a critical level, compression of the vegetable results in a large amount of fines due to shattering of the cells, which are brittle because of lack of sufficient moisture to plasticize them. The lower limit for the moisture content of vegetables to which the invention is appplicable to avoid shattering by compression with production of fines is about 7 percent.

On the other hand, all vegetables in the natural state contain very high concentrations of moisture. The high concentrations of moisture make it impossible to compress a vegetable as found in the natural state into a form of increased density without losing large quantities of the vegetable by extrusion of the vegetable between the walls of the press. The extruded material is no longer capable of restoration to the form of the original morsels of vegetable.

This apparently is caused by excessive plasticization of the vegetable cellular matter by very high concentrations of water. We have found that the upper limit for the moisture content of vegetables to which the invention is applicable to avoid extrusion of the vegetables between the walls of the press employed in compressing such vegetables is about 18 percent.

Thus in order to compress morsels of vegetables to which the invention is applicable without shattering them and producing a large amount of fines and without extruding a large amount of the vegetable matter and thus destroying the morsel form, it has been found necessary to predry (without freezing) the vegetables in morsel form to a moisture content from about 7 percent to about 18 percent. We prefer to carry out this predrying by air drying since this is a relatively economical method of drying vegetables and it can be readily stopped at a predetermined concentration and does not require a time-consuming equilibration step to insure relatively uniform distribution of the moisture throughout the vegetable morsels. In fact, we have found that it is best to compress the vegetable morsels as soon as possible after they are air dried to the proper concentration of moisture since waiting an appreciable length of time thereafter before compressing usually results in the production of fines because of excessive drying out of the surfaces of the vegetable morsels.

We have found certain moisture concentrations at the time of compression to be preferable for various vegetables in order to obtain the best results with respect to the amount of vegetable matter which, upon rehydration of the vegetable after compaction and redrying thereof to from 1 to 5 percent moisture content, is rehydratable to substantially the morsel form in which the vegetable existed prior to predrying, compression, and redrying of the vegetable. The preferred moisture range at the time of compression for peas is 7 to 13 percent, for green beans 7 to 10 percent, for spinach 10 to 18 percent, for carrots 7 to 14 percent, and for sweet corn 11 to 17 percent.

The air drying may be carried out in various types of air drying equipment. We have found a Proctor and Schwartz cabinet dryer to be particularly suitable for this purpose. we have found it to be particularly effective to conduct the air drying using air heated to temperatures from about 100° F. to about 180° F. Naturally the higher the temperature of the air, the more rapid the drying will be; but the use of air heated above 180° F. often results in deterioration of the acceptability of the product.

Vacuum drying (without freezing) in a vacuum oven can be employed. However, it is more costly than air drying.

Substantially immediately following the predrying of the vegetable morsels to the proper moisture concentration, the predried vegetable morsels are transferred to a press and compressed at a temperature of from about 110° F. to about 120° F. and with the application of pressure of from about 200 psi to about 4000 psi, employing a dwell time of about 10 seconds. The compressed vegetable mass may take various forms and may be produced in various sizes. We have found it particularly advantageous to produce either compressed bars or compressed discs of from about ⅛-inch to about ½-inch thickness.

The compressed vegetable mass, whatever the form thereof, is removed from the press and redried, i.e. further dehydrated, to a moisture content of from about 1 to about 5%. The redrying may be carried out by air drying, vacuum oven drying, or freeze-vacuum-dehydration. Redrying by air drying is generally carried out with air heated to 100° F. to 160° F. For most purposes, air drying will be adequate since the moisture concentration can be reduced by air drying to as low as about 4% in the vegetables to which the invention is applicable. Any moisture concentration of not more than 5% is sufficiently low for such vegetables to be storage stable for at least 3 years at 70° F. or at least 6 months at 100° F. when hermetically sealed in a moisture impermeable package. However, if it is desirable to obtain better storage stability, the moisture content of the compressed vegetable mass may be reduced to as low as about 3% by conductiing the redrying in a vacuum oven. If it is desired to still further improve the storage stability, the moisture content of the compressed vegetable mass may be reduced to as low as about 1% by freeze-vacuum-dehydrating the compressed vegetable mass. The densities of the compressed and redried vegetable masses will generally be from about 0.7 to about 1.2 grams per cc.

Following redrying, the compressed vegetable mass, if not to be used immediately, as is usually the case, is placed in a package which is impermeable to moisture and hermetically sealed therein. Such a package may be a metal can, but may also be a flexible package made of a laminate which usually comprises one lamina which is heat-sealable, such as polyethylene, another lamina, which is strong and resistant to most types of damage, such as polyethylene terephthalate, and is employed as the outermost lamina; while aluminum foil, which acts as an effective barrier to moisture, is sandwiched between the heat-sealable polyethylene lamina and the strong outer lamina of polyethylene terephthalate. When hermetically sealed in metal cans or the type of laminated flexible package described above, the compressed, redried, vegetable mass will usually be safely storable for at leat 3 years at 70° F. or at least 6 months at 100° F. without any appreciable reduction in acceptability from the acceptability it exhibited immediately following air drying, compression, and redrying as described above. Acceptability varies from one vegetable to another, depending to a considerable degree on personal preferences, but reasonably reproducible procedures for evaluating acceptability by hedonic scale testing have been developed.

Rehydration of reconstitution of the compacted, dehydrated, vegetable mass may be carried out by boiling a compressed and redried vegetable in bar or disc form for about 2 to 15 minutes in an excess of water, then permitting the boiled vegetable to stand and simmer in hot water maintained at 175 to 212° F for about 5 to 30 minutes. The reconstituted vegetable is then ready to be consumed or subjected to acceptance testing.

Acceptance testing is carried out on vegetable products which have been predried, compressed, and redried in accordance with the invention. The acceptance tests are conducted by reconstituting the vegetable as described above and submitting the reconstituted vegetable to a panel of ten trained food technologists who assign ratings for each quality characteristic being evaluated on each vegetable. The ratings are based on a hedonic scale of from 1 to 9 in which 9 represents excellent, 1 represents extremely poor, and 5 represents borderline acceptability. For any particular quality characteristic evaluated, if the average hedonic scale value is at least 5, the vegetable is definitely acceptable with respect to that quality characteristic. Overall acceptability may be estimated by averaging the various hedonic scale values for the different quality characteristics tested; but these would probably be best weighted according to relative importance of the different quality of characteristics selected for testing.

The invention has been found to be particularly effective with peas, green beans, spinach, carrots, and corn. However, it may also be applied to other vegetables, particularly those vegetables which are most desired when in morsel form, whether the morsels are naturally occurring entities as in the case of peas, or whether they are cut portions of a vegetable having a distinct shape, such as cut sections of a green bean, kernels cut off of an ear of corn, diced carrots, or chopped leaves of spinach. The important consideration is that these types of vegetable morsels retain the cellular structure of the vegetable substantially in the form occurring in the plant from which the vegetable is obtained and in which such morsels have developed widespread acceptability by the public with respect to the particular vegetable under consideration. Fresh or frozen and thawed vegetable morsels may be used in the process of the invention.

We will now disclose several specific examples of the production of compacted, dehydrated, vegetable products of increased density in accordance with the above-described principles. It will be understood, of course, that the above-mentioned and other advantages of our invention may also be accomplished by suitable variations in the detailed method steps, about to be set forth below, which are intended to be for illustrative purposes, and not for limiting the scope of our invention.

In the examples, compression ratio is to be understood to be the ratio of the volume of the umcompressed vegetable morsels, shaken by hand to effect settling in a container, to the volume of the compressed vegetable, whether the compressed vegetable be in disc or bar form or some other suitable compacted mass.

In the examples, the rehydration ratio of the vegetables is the ratio of the weight of vegetable after rehydration to the weight of the redried, compacted vegetable prior to rehydration thereof.

EXAMPLE I

Frozen green peas were thawed and then blanched by exposing them to water heated to about 205° F. for 5 minutes. The blanched peas were drained free of surface water, dipped in a 50 weight percent aqueous solution of sucrose to increase the adhesive capability of the peas, drained free of excess sucrose solution over that required to coat the surfaces of the peas, spread out on perforated trays, and predried by air drying in a Proctor and Schwartz cabinet dryer with air heated to about 120° F. circulating upwardly through the peas on the trays. The moisture content of the peas was reduced from an original value of about 78 percent to about 10 percent. The predried peas were removed from the dryer and immediately compressed at about 3000 psi in a Carver press employing a dwell time of about 10 seconds. Sufficient peas were compressed to produce a disc of about 3.5 inches diameter and about 3/16-inch thickness. The compression ratio was 3:1. Several such discs of compressed, predried peas were placed on trays in a Proctor and Schwartz cabinet dryer and redried by air drying to a final moisture content of about 5 percent employing air heated to about 120° F. The discs of redried, compacted peas were removed from the dryer and cooled to room temperature. The densities of the discs of redried, compacted peas were found to average 0.95 gram per cc.

The peas were rehydrated by placing one or more discs of the redried, compacted peas in an excess of boiling water over that required for rehydration of the peas, continuing to boil the water for 15 minutes, then allowing the peas to stand and simmer for 15 minutes more in water at a temperature of about 190° F. The rehydrated peas were strained to remove excess water and the rehydration ratio of the peas was determined to be 3:1.

The rehydrated peas were rated in accordance with a hedonic scale testing method in which ten trained food technologists rated the rehydrated peas on a nine-point scale as explained above. These ratings were made for color, odor, flavor, texture, and appearance. The rehydrated peas were found to be quite acceptable in all of these test categories, as will be seen in Table 1 below.

EXAMPLE II

Fresh, green beans were washed, drained, and cross cut into segments about ¾ to 1 inch long. The cut beans were blanched by exposing them to water heated to about 205° F. for 5 minutes. The blanched green beans were drained free of surface water, spread out on perforated trays, and predried by air drying in a Proctor and Schwartz cabinet dryer with air heated to about 110° F. circulating upwardly through the green bean segments on the trays. The moisture content of the beans was reduced from an original value of about 90 percent to about 7 percent. The predried beans were removed from the dryer and immediately compressed at about 4000 psi in a Carver press employing a dwell time of about 10 seconds. Sufficient bean segments were compressed to produce a disc of about 3.5 inches diameter and about 3/16-inch thickness. The compression ratio was 3:1. Several such discs of compressed, predried green beans were placed on trays in a Proctor and Schwartz cabinet dryer and redried by air drying to a final moisture content of about 5 percent employing air heated to about 110° F. The discs of redried, compacted green beans were removed from the dryer, cooled to room temperature, and the densities of the discs found to average 1.2 grams per cc.

The green beans were rehydrated by placing one or more discs of the redried, compacted green beans in an excess of boiling water over that required for rehydration of the beans, continuing to boil the water for 15 minutes, then allowing the beans to stand and simmer for 15 minutes more in water at a temperature of about 190° F. The rehydrated bean segments were strained to remove excess water and the rehydration ratio of the beans was determined to be 6.6:1.

The rehydrated green bean segments were tested and rated in accordance with a hedonic scale testing method similar to that described in Example I and found to be quite acceptable in all of the test categories, as will be seen in Table 1 below.

EXAMPLE III

Fresh, washed, spinach leaves were chopped to produce morsels of chopped spinach varying in size and in their outline shapes, being from about ¼-inch long on the shortest side to about 1½-inch long on the longest side. The thickness of the morsels of chopped spinach varied according to the maturity of the spinach leaves from which they were obtained. The chopped spinach was blanched by exposing it to water at about 205° F. for 5 minutes, then thoroughly drained, spread out on perforated trays, and air dried in a Proctor and Schwartz cabinet dryer with air at a temperature of about 110° F. circulating upwardly through the spinach on the trays. The moisture content of the chopped spinach was reduced from an original value of about 90.7 percent by weight to about 17 percent. The air dried spinach was removed from the cabinet dryer and immediately compressed at about 1000 psi in a Carver press employing a dwell time of about 10 seconds to produce discs of about 3.5 inches diameter and about 3/16-inch thickness. The compression ratio of the spinach was 8:1. Several such discs of compressed, predried, chopped spinach were placed on trays in a Proctor and Schwartz cabinet dryer and redried by air drying to a final moisture content of about 5 percent employing air heated to about 110° F. The discs of redried, compacted, chopped spinach were removed from the dryer, cooled to room temperature, and the densities of the discs found to average 0.7 gram per cc.

The spinach was rehydrated by placing one or more discs of the redried, compacted, chopped spinach in an excess of boiling water over that required for rehydration of the spinach, continuing to boil the water for 15 minutes, then allowing the spinach to stand and simmer for 15 minutes more in water at a temperature of about 190° F. The rehydrated, chopped spinach was strained to remove excess water and the the rehydration ratio of the chopped spinach was determined to be 6:1.

The rehydrated, chopped spinach was tested and rated in accordance with a hedonic scale testing method similar to that described in Example I and found to be quite acceptable in all of the test categories, as will be seen in Table 1 below.

EXAMPLE IV

Fresh whole carrots were washed, scraped substantially free of skin, rinsed to remove the remnants of the scraped skin, and cut to produce dice of about ¾-inch length on each side. The diced carrots were blanched by exposing them to water heated to about 205° F. for 5 minutes. The blanched, diced carrots were drained free of surface water, spread out on perforated trays, and predried by air drying in a Proctor and Schwartz cabinet dryer with air heated to about 110° F. circulating upwardly through the diced carrots on the trays. The moisture content of the diced carrots was reduced from an original value of about 88.2 percent to about 7 percent. The predried, diced carrots were removed from the dryer and immediately compressed at about 3500 psi in a Carver press employing a dwell time of about 10 seconds. Sufficient diced carrots were compressed to produce a disc of about 3.5 inches diameter and about 3/16-inch thickness. The compression ratio was 2.5:1. Several such discs of compressed, predried carrots were placed on trays in a Proctor and Schwartz cabinet dryer and redried by air drying to a final moisture content of about 5 percent employing air heated to about 120° F. The discs of redried, compacted carrots were removed from the dryer, cooled to room temperature, and the densities of the discs found to average 1.2 grams per cc.

The carrots were rehydrated by placing one or more discs of the redried, compacted carrots in an excess of boiling water over that required for rehydration of the carrots, continuing to boil the water for 15 minutes, then allowing the carrots to stand and simmer for 15 minutes more in water at a temperature of about 190° F. The rehydrated diced carrots were strained to remove excess water and the rehydration ratio of the diced carrots was determined to be 4.2:1.

The rehydrated diced carrots were tested and rated in accordance with a hedonic scale testing method similar to that described in Example I and found to be quite acceptable in a majority of the test categories, as will be seen in Table 1 below. In those categories in which the rehydrated diced carrots fell below the acceptable level, they were close to the acceptable level. The overall average of hedonic scale values was above the acceptable level.

EXAMPLE V

Kernels of fresh, sweet corn which had been cut off the cob were blanched by exposing them to water heated to about 205° F. for 5 minutes. The blanched corn kernels were drained free of surface water, spread out on perforated trays, and predried by air drying in a Proctor and Schwartz cabinet dryer with air heated to about 120° F. circulating upwardly through the corn kernels on the trays. The moisture content of the corn kernels was reduced from an original value of about 72 percent to about 14 percent. The predried corn kernels were removed from the dryer and immediately compressed at about 3500 psi in a Carver press employing a dwell time of about 10 seconds. Sufficient corn kernels were compressed to produce a disc of about 3.5 inches diameter and about 3/16-inch thickness. The compression ratio was 2.5:1. Several such discs of compressed, predried corn kernels were placed on trays in a Proctor and Schwartz cabinet dryer and redried by air drying to a final moisture content of about 5 percent employing air heated to about 120° F. The discs of redried, compacted corn kernels were removed from the dryer, cooled to room temperature and the densities of the discs were found to average 1.1 grams per cc.

The corn was rehydrated by placing one or more discs of the redried, compacted corn kernels in an excess of boiling water over that required for rehydration of the corn, continuing to boil the water for 15 minutes, then allowing the corn to stand and simmer for 15 minutes more in water at a temperature of about 190° F. The rehydrated corn kernels were strained to remove excess water and the rehydration ratio of the corn kernels was determined to be 2.7:1.

The rehydrated corn kernels were tested and rated in accordance with a hedonic scale testing method similar to that described in Example I and found to be quite acceptable in a majority of the test categories, as will be seen in Table 1 below. In those categories in which the rehydrated corn kernels fell below the acceptable level, they were close to the acceptable level. The overall average of hedonic scale values was well above the acceptable level.

Table 1 below summarizes the results of the acceptance testing based on quality characteristics as carried out on the five different dehydrated vegetables of Example I through V above, the acceptance testing having been conducted by a panel of ten trained food technologists as described above.

Table 1

| Rehydrated Vegetable | Quality Characteristics (Average of ten evaluations based on hedonic scale) | | | | |
|---|---|---|---|---|---|
| | Color | Odor | Flavor | Texture | Appearance |
| Peas | 6.5 | 6.4 | 6.4 | 5.8 | 5.5 |
| Green beans | 5.6 | 5.4 | 5.7 | 5.1 | 5.2 |
| Spinach | 6.0 | 6.2 | 6.1 | 6.4 | 6.0 |
| Carrots | 5.0 | 5.5 | 5.5 | 4.6 | 4.5 |
| Corn | 6.9 | 6.6 | 5.9 | 4.8 | 5.3 |

It is apparent from the above results that a wide variety of vegetables may be processed in accordance with the present invention to produce compacted, dehydrated, vegetable products of increased density characterized by good acceptability when rehydrated. When such products are hermetically sealed under vacuum in moisture-impermeable packages, they retain substantially as good acceptability after relatively longterm storage, such as at least 3 years at temperatures up to 70° F. or at least 6 months at temperatures up to 100° F., as the compacted, dehydrated, vegetable products had immediately following redrying thereof.

The invention is particularly useful for reducing the volume occupied by, and the weight of, a given quantity of vegetable. In this form, the vegetable is very storage stable if vacuum-packed in a moisture-impermeable container. The compacted, dehydrated, vegetable products are readily rehydrated and prepared for consumption by boiling in water and simmering for relatively short periods of time. The process is much more economical than prior processes for the compaction and dehydration of vegetables, particularly when compared to freeze-vacuum-deydration and compression of similar vegetable materials.

It will be understood that various changes in the details, materials and arrangements of parts which have been herein described and illustrated in order to explain the nature of the invention, may be made by those skilled in the art within the principle and scope of the invention.

We claim:

1. A process for making a compacted, dehydrated, vegetable mass characterized by having a density of about 0.7 to 1.2 grams per cc and being capable of rehydration to produce distinct particles of rehydrated vegetable which have substantially the same size and shape characteristics as the particles of vegetables from which said compacted, dehydrated, vegetable mass is prepared and which are acceptable in accordance with hedonic scale testing, which comprises the steps of:
    a. predrying, without freezing, particles of a vegetable to a moisture content of about 7 to 18 percent by weight, said particles being substantially of a size and shape in which said vegetable occurs naturally or in a subdivided particle form of said vegetable in which the cellular structure of said vegetable is present substantially in the form occurring in the plant from which said vegetable is obtained,
    b. compressing said predried particles of vegetable at a temperature of about 110°F. to 120°F. and a pressure of about 200 psi to 4000 psi for a sufficient period of time to cause said particles of vegetable to adhere together in a compacted, vegetable mass while maintaining the moisture content of said particles of vegetable and said compacted, vegetable mass at from about 7 to about 18 percent by weight, and
    c. redrying said compacted vegetable mass to a moisture content of about 1 to 5 percent by weight.

2. A process according to claim 1, wherein said step of predrying is carried out by air drying said particles of a vegetable with heated air.

3. A process according to claim 2, wherein said heated air is at a temperature from about 100° F. to about 180° F.

4. A process according to claim 1, wherein said step of redrying is carried out by air drying said compacted, vegetable mass with heated air.

5. A process according to claim 4, wherein said heated air is at a temperature from about 100° F. to about 160° F.

6. A process according to claim 1, wherein said step of predrying is carried out by vacuum oven drying said particles of a vegetable.

7. A process according to claim 1, wherein said step of redrying is carried out by vacuum oven drying said compacted vegetable mass.

8. A process according to claim 1, wherein said step of redrying is carried out by freeze-vacuum-dehydration of said compacted, vegetable mass.

9. A process according to claim 2, wherein said step of redrying is carried out by air drying said compacted, vegetable mass with heated air.

10. A process according to claim 3, wherein said step of redrying is carried out by air drying said compacted, vegetable mass with air heated to a temperature from about 100° F. to about 160° F.

11. A process according to claim 1, wherein said vegetable is selected from peas, corn, carrots, green beans and spinach.

* * * * *